(12) United States Patent
Foster et al.

(10) Patent No.: US 12,110,666 B2
(45) Date of Patent: Oct. 8, 2024

(54) ADJUSTABLE ANTI-FREEZE FAUCET

(71) Applicant: The Mosack Group, Inc., Matthews, NC (US)

(72) Inventors: Daniel Foster, Troutman, NC (US); Matthew Williams, Matthews, NC (US)

(73) Assignee: The Mosack Group, Inc., Mint Hill, NC (US)

( * ) Notice: Subject to any disclaimer, the term of this patent is extended or adjusted under 35 U.S.C. 154(b) by 810 days.

(21) Appl. No.: 16/968,969

(22) PCT Filed: Feb. 19, 2019

(86) PCT No.: PCT/US2019/018482
§ 371 (c)(1),
(2) Date: Aug. 11, 2020

(87) PCT Pub. No.: WO2019/161356
PCT Pub. Date: Aug. 22, 2019

(65) Prior Publication Data
US 2020/0399871 A1    Dec. 24, 2020

Related U.S. Application Data

(60) Provisional application No. 62/632,314, filed on Feb. 19, 2018.

(51) Int. Cl.
*E03B 7/12* (2006.01)
*E03B 9/02* (2006.01)
*F16L 27/12* (2006.01)

(52) U.S. Cl.
CPC ............... *E03B 7/12* (2013.01); *E03B 9/025* (2013.01); *F16L 27/1273* (2019.08); *F16L 27/1274* (2019.08); *F16L 27/1275* (2019.08)

(58) Field of Classification Search
CPC ........ E03B 7/12; E03B 9/025; F16L 27/1273; F16L 27/1274; F16L 27/1275
See application file for complete search history.

(56) References Cited

U.S. PATENT DOCUMENTS 2,700,370 A * 1/1955 Goff ..................... A01K 39/022
                                                    119/61.2
3,118,692 A    1/1964 Fitzhugh
(Continued)

FOREIGN PATENT DOCUMENTS

| DE | 20317852 U1 | 1/2004 |
| GB | 765218 A * | 9/1957 |
| WO | 2019/161356 A1 | 8/2019 |

OTHER PUBLICATIONS

International Search Report in counterpart International Application No. PCT/US19/18482 dated Apr. 30, 2019, pp. 1-4.
(Continued)

*Primary Examiner* — James M Hewitt, II
(74) *Attorney, Agent, or Firm* — Additon, Pendleton & Witherspoon, P.A.

(57) ABSTRACT

A coupling mechanism can be used to selectively secure two sections of telescopically engaged pipe in a fixed position relative to each other and provide a fluid (e.g., gas and/or liquid) seal between the coupling mechanism and the two pipes, regardless of whether the pipes are secured in the fixed position or are freely moveable relative to each other. The coupling mechanism can be used as part of a faucet assembly, which can include an adjustable faucet assembly including the telescopically engaged pipe.

21 Claims, 11 Drawing Sheets

(56) References Cited

U.S. PATENT DOCUMENTS

| | | | |
|---|---|---|---|
| 3,971,401 A | 7/1976 | Persson | |
| 4,099,670 A * | 7/1978 | Cole | B05B 15/74 |
| | | | 285/302 |
| 4,473,244 A | 9/1984 | Hill | |
| 5,024,469 A | 6/1991 | Aitken et al. | |
| 5,035,257 A * | 7/1991 | Antunez | F16K 31/34 |
| | | | 137/550 |
| 5,392,805 A | 2/1995 | Chrysler | |
| 5,697,393 A | 12/1997 | Mirlisena, Sr. | |
| 5,738,140 A | 4/1998 | Mann | |
| 5,740,831 A | 4/1998 | DeNardo et al. | |
| 5,752,542 A | 5/1998 | Hoeptner, III | |
| 5,979,490 A | 11/1999 | Mirlisena, Sr. | |
| 6,142,172 A | 11/2000 | Shuler et al. | |
| 6,322,006 B1 * | 11/2001 | Guo | B05B 15/628 |
| | | | 285/302 |
| 6,471,249 B1 | 10/2002 | Lewis | |
| 6,532,986 B1 | 3/2003 | Dickey et al. | |
| 6,668,852 B1 | 12/2003 | Williamson | |
| 6,769,446 B1 | 8/2004 | Ball et al. | |
| 7,921,482 B2 | 4/2011 | Shafik | |
| 8,777,274 B2 * | 7/2014 | Chou | F16L 27/1274 |
| | | | 285/298 |
| 9,212,471 B2 | 12/2015 | Ball et al. | |
| 9,234,333 B2 | 1/2016 | Ko | |
| 9,303,783 B1 | 4/2016 | Ko | |
| 9,765,912 B2 | 9/2017 | Spears et al. | |
| 2010/0206392 A1 | 8/2010 | Ball et al. | |
| 2014/0131545 A1 | 5/2014 | Holt | |
| 2017/0159269 A1 | 6/2017 | Wu | |

OTHER PUBLICATIONS

International Written Opinion in counterpart International Application No. PCT/US19/18482 dated Apr. 30, 2019, pp. 1-10.

Search Report in counterpart European Application No. 19754609.6 dated Oct. 20, 2021, pp. 1-11 [U.S. Pat. No. 5,697,393 previously cited].

Office Action in counterpart European Application No. 19754609.6 dated Jul. 11, 2023, pp. 1-9 [All references previously cited].

\* cited by examiner

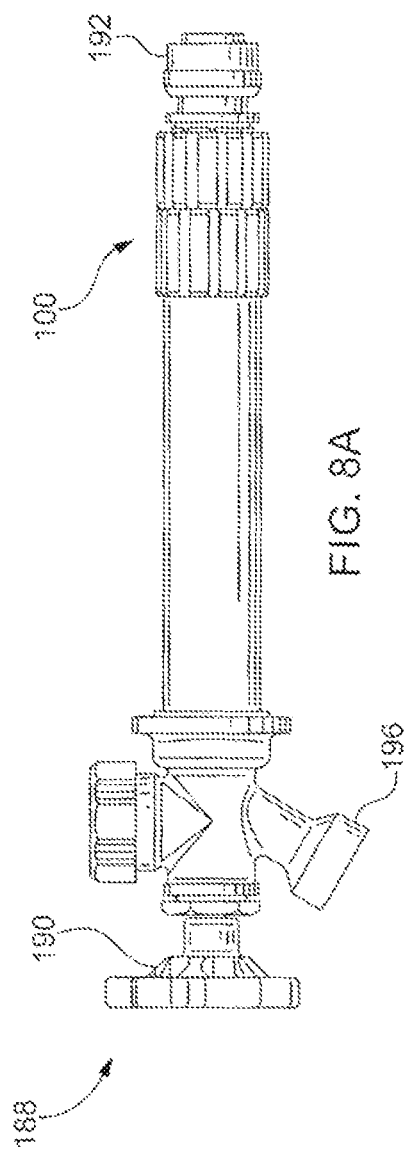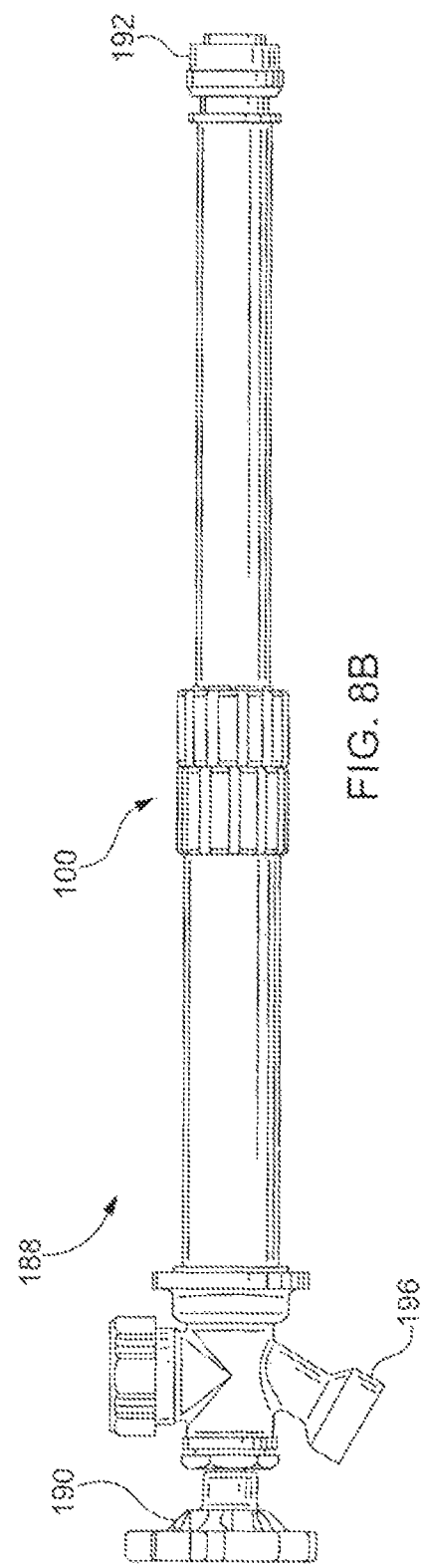

ADJUSTABLE ANTI-FREEZE FAUCET

FIELD OF THE INVENTION

The present invention relates to a telescoping faucet body, especially a coupling mechanism that can be used to selectively secure two sections of telescopically engaged pipe in a fixed position relative to each other and provide a fluid (e.g., gas and/or liquid) seal between it and the two pipes, regardless of whether the pipes are secured in the fixed position or are freely moveable relative to each other.

BACKGROUND OF THE INVENTION

Anti-freeze faucet assemblies can provide flow control capabilities through the wall of a building and provide protection from freezing by locating the shut-off mechanism within an above freezing-temperature environment (e.g., within the temperature controlled building structure). Conventional anti-freeze faucets are manufactured with different fixed length to accommodate difference in building exterior wall thickness. This can result in requiring sellers and installers of such faucets to maintain a large inventory of multiple products. This also makes installation in buildings where the exterior wall thickness does not neatly conform to the available fixed length faucets very challenging. Some anti-freeze faucet assemblies can be adjustable by providing a coupling for two sections of pipe. Yet, designs of known anti-freeze faucet assemblies can be limited in functionality. In addition, known systems fail to provide faucet assemblies with coupling and sealing mechanisms that are independent of each other, a means for tool free adjustment of faucet assembly length, and a means for a visual indication of proper adjustment of the coupling mechanism.

Known methods and systems for providing anti-freeze faucets can be appreciated from U.S. Pat. Nos. 3,971,401, 4,473,244, 5,024,469, 5,392,805, 5,697,393, 5,738,140, 5,740,831, 5,752,542, 5,979,490, 6,142,172, 6,532,986, 6,668,852, 6,769,446, 9,212,471, 9,234,333, 9,303,783, U.S. Pat. Publ. No. 2010/0206392, and U.S. Pat. Publ. No. 2017/0159269.

SUMMARY OF THE INVENTION

In at least one embodiment, an adjustable anti-freeze faucet system can include a first pipe having an inner diameter and a second pipe having an outer diameter, the first pipe inner diameter being greater than the second pipe outer diameter so as to allow the second pipe to axially traverse the first pipe in a telescoping manner. The anti-freeze faucet system can include a coupling mechanism. The coupling mechanism can include a coupling body having a coupling body top, a coupling body bottom, a coupling body outer surface, a coupling body inner surface, and a coupling body opening within a volume of space defined by the coupling body inner surface, wherein a coupling body longitudinal axis runs from the coupling body top to the coupling body bottom. In some embodiments, the coupling body bottom is deflectable radially inward towards and radially outward away from the coupling body longitudinal axis. The coupling mechanism can include a coupling handle having a coupling handle top, a coupling handle bottom, a coupling handle outer surface, a coupling handle inner surface, and a coupling handle opening within a volume of space defined by the coupling handle inner surface, wherein a coupling handle longitudinal axis runs from the coupling handle top to the coupling handle bottom. In some embodiments, the coupling handle opening at the coupling handle top can be configured to receive a portion of the coupling body when the coupling body longitudinal axis is coaxial with the coupling handle longitudinal axis. In some embodiments, the coupling body opening at the coupling body top can be configured to receive a distal end of the first pipe and retain the first pipe in a fixed position relative to the coupling body. In some embodiments, each of the coupling body opening at the coupling body bottom and the coupling handle opening at the coupling handle bottom can be configured to receive a distal end of the second pipe and allow axial motion of the second pipe relative to the first pipe and allow axial motion of the second pipe relative to the coupling mechanism. In some embodiments, the coupling handle can be configured to selectively engage with the coupling body bottom, wherein the engagement is capable of exerting a radially inward pressure on the coupling body bottom. The anti-freeze faucet system can also include an exterior handle connected to the first pipe. The anti-freeze faucet system can include a shut off mechanism located within the second pipe. The anti-freeze faucet system can include a telescoping rotating shaft mechanically connected to the exterior handle, the telescoping rotating shaft configured to operate the shut off mechanism.

In some embodiments, the adjustable faucet system recited in claim 1, the engagement of the coupling handle with the coupling body can generate a locked state when the coupling handle exerts the radially inward pressure on the coupling body bottom. In some embodiments, the locked state can prevent movement of the second pipe relative to the first pipe and/or the coupling mechanism by the coupling body bottom exerting pressure against an outer surface of the second pipe. The engagement of the coupling handle with the coupling body can generate an unlocked state when the coupling handle does not exert the radially inward pressure on the coupling body bottom. The unlocked state can allow for movement of the second pipe relative to the first pipe and/or the coupling mechanism by the coupling body bottom not exerting pressure against the outer surface of the second pipe.

In some embodiments, the locked state can be generated when the coupling handle is traversed along the coupling body longitudinal axis in a direction towards the coupling body so as to be positioned over at least the coupling body bottom, wherein at least a portion of the coupling handle inner surface exerts the radially inward pressure on the coupling body bottom.

In some embodiments, the locked state can be generated when the coupling handle is positioned over at least the coupling body bottom and is caused to move radially inward towards the coupling body longitudinal axis so that at least a portion of the coupling handle inner surface exerts the radially inward pressure on the coupling body bottom.

In some embodiments, the coupling body can be engaged by threads with the coupling handle. In some embodiments, the coupling handle can be configured as a ring with a break that is bridged by a cam-clamp. In some embodiments, the coupling handle can be configured as a band mechanically connected to a wormgear.

In some embodiments, the coupling body inner surface can include a sealing mechanism configured to provide a fluid seal between the coupling body inner surface and an outer surface of the second pipe in the locked state. In some embodiments, the sealing mechanism includes an elastomeric body and a track formed in the coupling body inner surface. The track can be configured to receive and retain the elastomeric body. In some embodiments, the elastomeric body deforms when the second pipe is inserted into the coupling body bottom opening, and the coupling body is in the locked state, wherein the deformation forms the fluid seal.

In some embodiments, the coupling body bottom can include a visual indicator. In some embodiments, the visual indicator can be located on the coupling body outer surface at or near a distal end of the coupling body bottom. In some embodiments, the distal end of the coupling body bottom can be configured to extend beyond a distal end of the coupling handle bottom when the locked state is generated, thereby exposing the visual indicator. The distal end of the coupling body bottom can be configured to not extend beyond a distal end of the coupling handle bottom when the unlocked state is generated, thereby concealing the visual indicator.

In some embodiments, the coupling body bottom can be configured as a flanged structure having at least one finger. In some embodiments, the at least one finger can be configured as a deflectable member extending from the coupling body bottom along a direction that is parallel with the coupling body longitudinal axis.

In at least one embodiment, anti-freeze adjustable faucet system can include a first pipe having an inner diameter and a second pipe having an outer diameter, the first pipe inner diameter being greater than the second pipe outer diameter so as to allow the second pipe to axially traverse the first pipe in a telescoping manner. The anti-freeze adjustable faucet system can include a coupling mechanism. The coupling mechanism can include a coupling body having a coupling body top, a coupling body bottom, a coupling body outer surface, a coupling body inner surface, and a coupling body opening within a volume of space defined by the coupling body inner surface, wherein a coupling body longitudinal axis runs from the coupling body top to the coupling body bottom. The coupling body bottom can be deflectable radially inward towards and radially outward away from the coupling body longitudinal axis. The coupling mechanism can include a coupling handle having a coupling handle top, a coupling handle bottom, a coupling handle outer surface, a coupling handle inner surface, and a coupling handle opening within a volume of space defined by the coupling handle inner surface, wherein a coupling handle longitudinal axis runs from the coupling handle top to the coupling handle bottom. In some embodiments, the coupling handle opening at the coupling handle top can be configured to receive a portion of the coupling body when the coupling body longitudinal axis is coaxial with the coupling handle longitudinal axis. In some embodiments, the coupling body opening at the coupling body top can be configured to receive a distal end of the first pipe and retain the first pipe in a fixed position relative to the coupling body. In some embodiments, each of the coupling body opening at the coupling body bottom and the coupling handle opening at the coupling handle bottom can be configured to receive a distal end of the second pipe and allow axial motion of the second pipe relative to the first pipe and allow axial motion of the second pipe relative to the coupling mechanism. In some embodiments, the coupling handle can be configured to selectively engage with the coupling body bottom, wherein the engagement is capable of exerting a radially inward pressure on the coupling body bottom.

The anti-freeze adjustable faucet system can also include an exterior handle connected to the first pipe. The anti-freeze adjustable faucet system can include a shut off mechanism located within the second pipe. The anti-freeze adjustable faucet system can include a telescoping rotating shaft mechanically connected to the exterior handle. The telescoping rotating shaft can be configured to operate the shut off mechanism. The engagement of the coupling handle with the coupling body can generate a locked state when the coupling handle exerts the radially inward pressure on the coupling body bottom. The locked state can prevent movement of the second pipe relative to the first pipe and/or the coupling mechanism by the coupling body bottom exerting pressure against an outer surface of the second pipe. The engagement of the coupling handle with the coupling body can generate an unlocked state when the coupling handle does not exert the radially inward pressure on the coupling body bottom. The unlocked state can allow for movement of the second pipe relative to the first pipe and/or the coupling mechanism by the coupling body bottom not exerting pressure against the outer surface of the second pipe. The coupling body bottom can include a visual indicator located on the coupling body outer surface at or near a distal end of the coupling body bottom.

In some embodiments, the distal end of the coupling body bottom can be configured to extend beyond a distal end of the coupling handle bottom when the locked state is generated, thereby exposing the visual indicator. The distal end of the coupling body bottom can be configured to not extend beyond a distal end of the coupling handle bottom when the unlocked state is generated, thereby concealing the visual indicator. In some embodiments, the visual indicator can include a marking and/or a shape.

In at least one embodiment, a coupling mechanism can include a coupling body having a coupling body top, a coupling body bottom, a coupling body outer surface, a coupling body inner surface, and a coupling body opening within a volume of space defined by the coupling body inner surface, wherein a coupling body longitudinal axis runs from the coupling body top to the coupling body bottom. The coupling body bottom can be deflectable radially inward towards and radially outward away from the coupling body longitudinal axis. The coupling mechanism can also include a coupling handle having a coupling handle top, a coupling handle bottom, a coupling handle outer surface, a coupling handle inner surface, and a coupling handle opening within a volume of space defined by the coupling handle inner surface, wherein a coupling handle longitudinal axis runs from the coupling handle top to the coupling handle bottom. The coupling handle opening at the coupling handle top can be configured to receive a portion of the coupling body when the coupling body longitudinal axis is coaxial with the coupling handle longitudinal axis. The coupling body opening at the coupling body top can be configured to receive a distal end of a first pipe and retain the first pipe in a fixed position relative to the coupling body. Each of the coupling body opening at the coupling body bottom and the coupling handle opening at the coupling handle bottom can be configured to receive a distal end of a second pipe and allow axial motion of the second pipe relative to the first pipe and allow axial motion of the second pipe relative to the coupling mechanism. The coupling handle can be configured to selectively engage with the coupling body bottom, wherein the engagement is capable of exerting a radially inward pressure on the coupling body bottom.

In some embodiments, the engagement of the coupling handle with the coupling body can generate a locked state when the coupling handle exerts the radially inward pressure on the coupling body bottom. The engagement of the coupling handle with the coupling body can generate an unlocked state when the coupling handle does not exert the radially inward pressure on the coupling body bottom. The locked state can prevent movement of the second pipe relative to the first pipe and/or the coupling mechanism by the coupling body bottom exerting pressure against an outer surface of the second pipe. The unlocked state can allow movement of the second pipe relative to the first pipe and/or the coupling mechanism by the coupling body bottom not exerting pressure against the outer surface of the second pipe.

Further features, aspects, objects, advantages, and possible applications of the present invention will become apparent from a study of the exemplary embodiments and examples described below, in combination with the Figures, and the appended claims.

BRIEF DESCRIPTION OF THE DRAWINGS

The above and other objects, aspects, features, advantages and possible applications of the present innovation will be more apparent from the following more particular description thereof, presented in conjunction with the following drawings. Like reference numbers used in the drawings may identify like components.

FIG. 8A shows an embodiment of the coupling mechanism used with an embodiment of an adjustable faucet assembly, where the faucet assembly is in a contracted state.

FIG. 8B shows an embodiment of the coupling mechanism used with an embodiment of an adjustable faucet assembly, where the faucet assembly is in an extended state.

DETAILED DESCRIPTION OF THE INVENTION

The following description is of exemplary embodiments that are presently contemplated for carrying out the present invention. This description is not to be taken in a limiting sense, but is made merely for the purpose of describing the general principles and features of the present invention. The scope of the present invention is not limited by this description.

Figure 1:
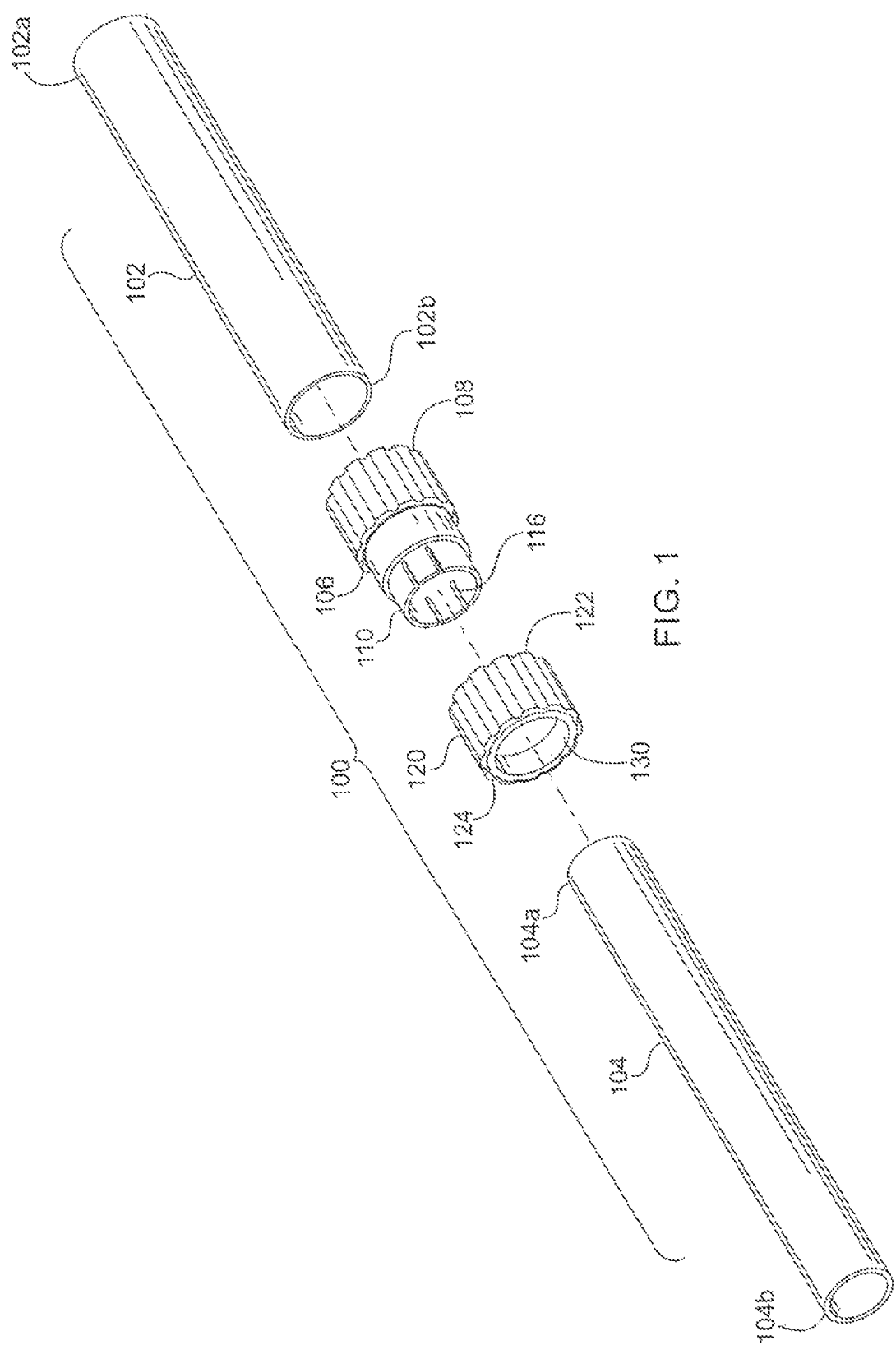
FIG. 1 shows a schematic of an embodiment of a coupling mechanism in juxtaposition with two sections of pipe.
Figure 2:
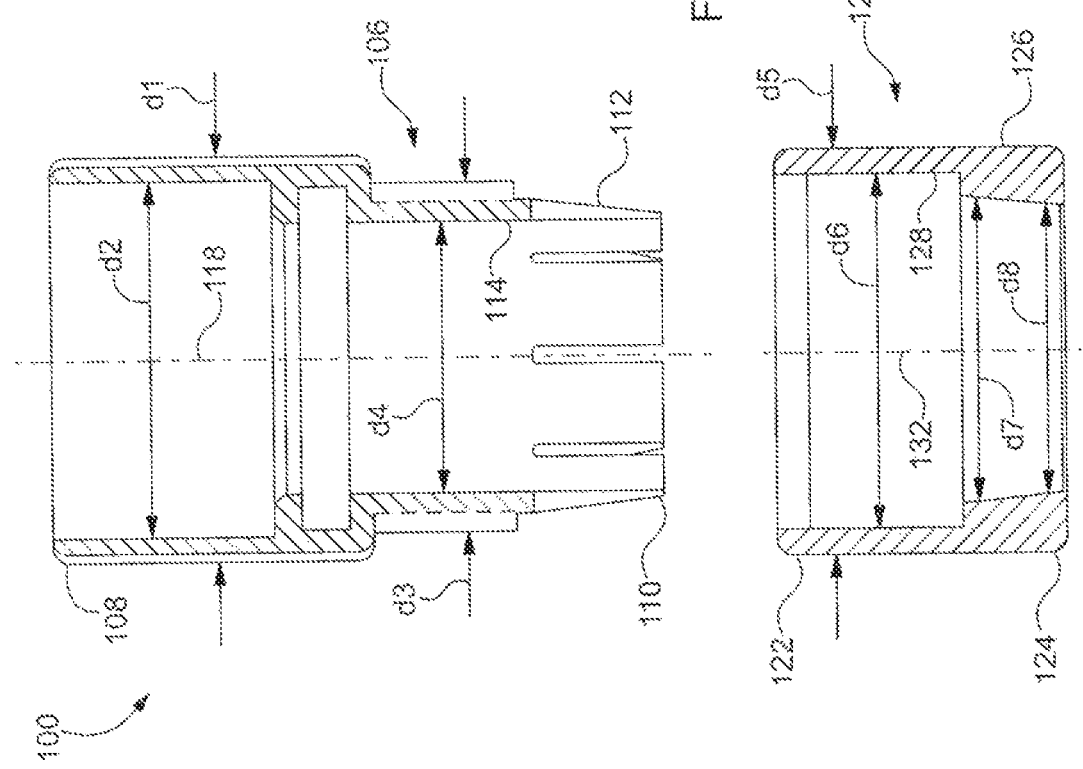
FIG. 2 is a schematic of cross-sectional views of an embodiment of the coupling body and an embodiment of the coupling handle.
Figure 3:
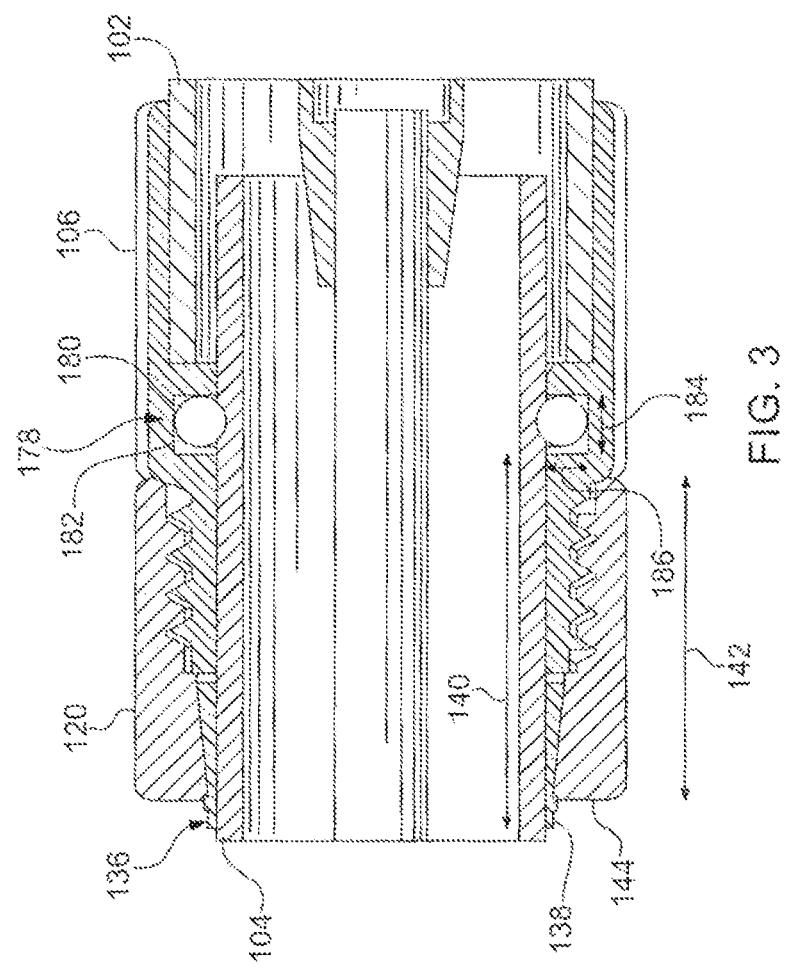
FIG. 3 shows cross sectional views of an embodiment of the coupling mechanism coupling two sections of pipe.

Referring to FIGS. 1-3, disclosed are embodiments of a coupling mechanism 100 that can be used to selectively secure two sections of telescopically engaged pipe 102, 104 in a fixed position relative to each other and provide a fluid (e.g., gas and/or liquid) seal between to the coupling mechanism 100 and the two sections of pipe 102, 104, regardless of whether the pipes 102, 104 are secured in the fixed position or are freely moveable relative to each other. In some embodiments, the coupling mechanism 100 can be used as part of a faucet assembly 188 (see FIGS. 8-9). While the various embodiments disclosed herein show the coupling mechanism 100 being used with two pipes 102, 104 to form a faucet assembly 188, it is understood that the coupling mechanism 100 can be used in any system in which two structures (e.g., pipes, bars, rods, guides, tracks, etc.) are telescopically engaged.

The coupling mechanism 100 can include a coupling body 106. The coupling body 106 can be fabricated from a rigid material, such as metal, plastic, polyurethane, etc. The coupling body 106 can be an annular object having a coupling body top 108, a coupling body bottom 110, a coupling body outer surface 112, a coupling body inner surface 114, and a coupling body opening 116 within a volume of space defined by the coupling body inner surface 114. A coupling body longitudinal axis 118 can run from the coupling body top 108 to the coupling body bottom 110. The coupling body outer surface 112 can have a shape of that is circular, square, hexagonal, etc. The coupling body inner surface 114 can have a shape of that is circular, square, hexagonal, etc. The coupling body outer surface 112 can have a shape that is the same as or different from a shape of the coupling body inner surface 114. Any portion of any of the coupling body outer surface 112 and the coupling body inner surface 114 can be smooth, textured, ribbed, etc. It is contemplated for the coupling body 106 to be configured as a collar so as to facilitate at least a portion of the coupling body opening 116 receiving a first pipe 102 and a second pipe 104.

The coupling mechanism 100 can include a coupling handle 120. The coupling handle 120 can be fabricated from a rigid material, such as metal, plastic, polyurethane, etc. The coupling handle 120 can be an annular object having a coupling handle top 122, a coupling handle bottom 124, a coupling handle outer surface 126, a coupling handle inner surface 128, and a coupling handle opening 130 within a volume of space defined by the coupling handle inner surface 128. A coupling handle longitudinal axis 132 can run from the coupling handle top 122 to the coupling handle bottom 124. The coupling handle outer surface 126 can have a shape of that is circular, square, hexagonal, etc. The coupling handle inner surface 128 can have a shape of that is circular, square, hexagonal, etc. The coupling handle outer surface 126 can have a shape that is the same as or different from a shape of the coupling handle inner surface 128. Any portion of any of the coupling handle outer surface 126 and the coupling handle inner surface 128 can be smooth, textured, ribbed, etc. It is contemplated for the coupling handle 120 to be configured as a collar so as to facilitate at least a portion of the coupling handle opening 130 receiving a portion of the coupling body 106 and a portion of the second pipe 104.

The coupling body outer surface 112 at or near the coupling body top 108 can have an outer diameter of d1. The coupling body inner surface 114 at or near the coupling body top 108 can have an inner diameter of d2. The coupling body outer surface 112 at or near the coupling body bottom 110 can have an outer diameter of d3. The coupling body inner surface 114 at or near the coupling body bottom 110 can have an inner diameter of d4. The coupling handle outer surface 126 at or near the coupling handle top 122 can have an outer diameter of d5. The coupling handle inner surface 128 at or near the coupling handle top 122 can have an inner diameter of d6. The coupling handle outer surface 126 at or near the coupling handle bottom 124 can have an outer diameter of d7. The coupling handle inner surface 128 at or near the coupling handle bottom 124 can have an inner diameter of d8. d1 can be equal to d5 and d7 so that when the coupling body 106 and the coupling handle 120 engage each other the coupling mechanism 100 can have an overall outer diameter of any one of d1, d5, and d7. d3 can be less than d1 and equal to or slightly less than d6 so that the coupling handle top 122 can traverse over the coupling body bottom 110. d8 can be slightly less than d6 so that when the coupling handle top 122 traverses over the coupling body bottom 110 (e.g., the coupling handle 120 is moved in a direction towards the coupling body 106), the coupling handle top 122 exerts a radially inward pressure on the coupling body bottom 110 (radially inward towards the coupling body longitudinal axis 118). In some embodiments, the coupling handle inner surface 128 can have an inner diameter that gradually decreases from d6 to d8. d2 can be set to be equal to or slightly larger than an outer diameter of the first pipe 102 so as to facilitate the coupling body top 108 receiving a portion of the first pipe 102. d4 can be set to be equal to or slightly larger than an outer diameter of the second pipe 104 so as to facilitate the coupling body bottom 110 receiving a portion of the second pipe 104.

For example, the coupling body 106 and coupling handle 120 can be aligned so that the coupling body longitudinal axis 118 and the coupling handle longitudinal axis 132 are coaxial. The coupling handle top 122 can be traversed over the coupling body bottom 110 (e.g., the coupling handle 120 is moved in a direction towards the coupling body 106), and as the coupling handle 120 is further traversed over the coupling body 106, the coupling handle inner surface 128 at or near the coupling handle bottom 124 engages the coupling body bottom 110 and causes the coupling body bottom 110 to move radially inward towards the coupling body longitudinal axis 118 and the coupling handle longitudinal axis 132. Before the coupling body bottom 110 is moved radially inward towards the coupling body longitudinal axis 118 and the coupling handle longitudinal axis 132, the second pipe 104 can be placed within the coupling body bottom 110. The first pipe 102 can be placed in the coupling body top 108. The first pipe 102 can be secured to the coupling body top 108 via an interference fit, an adhesive, solder, or by some other means. As the coupling body bottom 110 is moved radially inward towards the coupling body longitudinal axis 118 and the coupling handle longitudinal axis 132, the coupling body bottom 110 exerts a pressure against an outer surface of the second pipe 104. This can secure the coupling mechanism 100 about both the first pipe 102 and the second pipe 104.

The first pipe 102 can have an inner diameter that is greater than an outer diameter of the second pipe 104, thereby allowing the second pipe 104 to axially traverse the first pipe 102 in a telescoping manner. When the first pipe 102 is secured to the coupling body top 108, the second pipe 104 is inserted into the coupling body bottom 110, and the coupling handle 120 is not exerting a radial force on the coupling body bottom 110, the second pipe 104 can be freely moved relative to the first pipe 102 and/or the coupling mechanism 100. When the coupling handle top 122 is traversed over the coupling body bottom 110 in a direction towards the coupling body 106, the radial force causes the coupling body bottom 110 to press against the outer surface of the second pipe 104, thereby preventing the second pipe 104 from moving relative to the first pipe 102 and/or the coupling mechanism 100.

Figure 4:
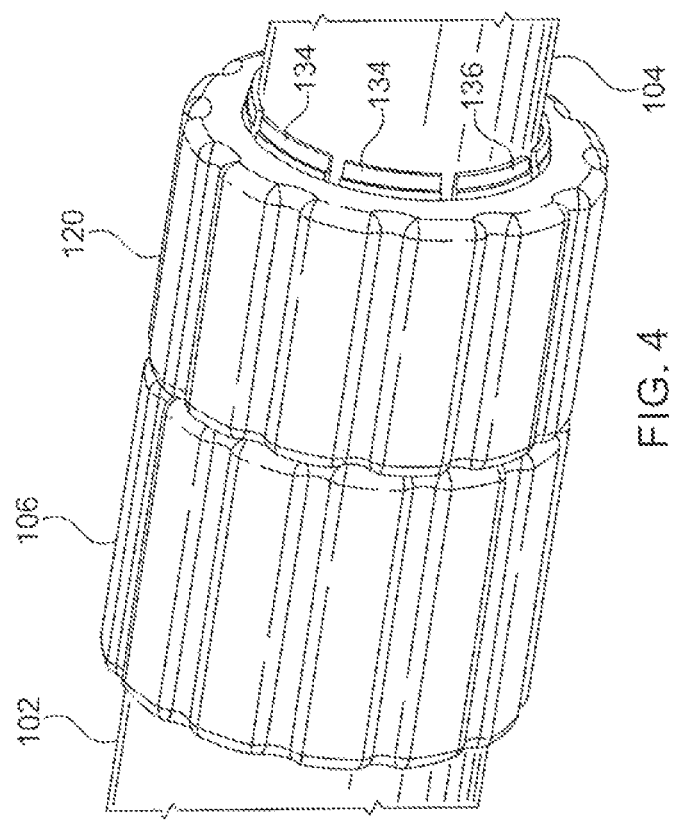
FIG. 4 is an embodiment of the coupling mechanism coupling two sections of pipe, showing fingers and visual indicators of an embodiment of the coupling body.

Referring to FIG. 4, in some embodiments, the coupling body bottom 110 can be configured as a flanged structure having at least one finger 134. Each finger 134 can be a deflectable member extending from the coupling body bottom 110. This can include extending along a direction that is parallel with the coupling body longitudinal axis 118. Each finger 134 can be independently deflectable from each other. The deflection of each finger 134 can be in the radial direction (e.g., to and from the coupling body longitudinal axis 118). As the coupling handle top 122 is traversed over the coupling body bottom 110 in a direction toward the coupling body 106, the radial force can cause at least one finger 134 of the coupling body bottom 110 to press against the outer surface of the second pipe 104.

Referring back to FIG. 3, in at least one embodiment, the coupling handle inner surface 128 at or near the coupling handle top 122 can be threaded. The coupling body outer surface 112 at or near the coupling body bottom 110 can be threaded. The thread of the coupling handle 120 can be complementary to the thread of the coupling body 106 so as to facilitate a threading engagement between the coupling body 106 and the coupling handle 120. To traverse the coupling handle 120 over the coupling body 106, the threads can be mated and the coupling handle 120 can be rotated relative to the coupling body 106. As the coupling handle 120 is rotated in a first direction, the threads can cause the coupling handle 120 to move in a direction that is towards the coupling body 106. As the coupling handle 120 is rotated in a second direction, the threads can cause the coupling handle 120 to move in a direction that is away from the coupling body 106. As the coupling handle 120 is rotated in the first direction and caused to move in a direction that is towards the coupling body 106, the coupling handle top 122 can exert the radially inward pressure on the coupling body bottom 110 (radially inward towards the coupling body longitudinal axis 118). As the coupling handle 120 is rotated in the second direction and caused to move in a direction that is away from the coupling body 106, the radially inward pressure on the coupling body bottom 110 is relieved.

Referring to FIGS. 3-4, in at least one embodiment, the distal end 138 of the coupling body bottom 110 can include a visual indicator 136. The visual indicator 136 can be a marking, a shape, etc. In at least one embodiment, the visual indicator 136 is a colored portion of the coupling body bottom 110. The visual indicator 136 can be positioned on the coupling body outer surface 112 at or near the distal end 138 of the coupling body bottom 110. The visual indicator 136 can be used as an indicator that the coupling mechanism 100 is in a locked state. A locked state can be defined as when the radial force causes the coupling body bottom 110 to press against the outer surface of the second pipe 104, thereby preventing the second pipe 104 from moving relative to the first pipe 102 and/or the coupling mechanism 100. An unlocked state can be defined as when the coupling handle 120 is not exerting a radial force on the coupling body bottom 110 (or the radial force exerted is weak enough) so that second pipe 104 can be freely moved relative to the first pipe 102 and/or the coupling mechanism 100.

The amount of exerted radial inward force can depend on the amount the coupling handle 12 is traversed over the coupling body 106. For example, the gradual decrease in diameter from d6 to d8 causes more and more radially inward pressure as the coupling handle 120 is moved more and more toward the coupling body 106. The coupling body bottom length 140 and the coupling handle length 142 can be set to cause the distal end 138 of the coupling body bottom 110 to extend beyond a distal end 144 of the coupling handle 120 when a predetermined amount of radially inward force is exerted. The predetermined amount of radially inward force can be the force needed to generate the locked state. The coupling body bottom length 140 and the coupling handle length 142 can be set to cause the distal end 138 of the coupling body bottom 110 to not extend beyond the distal end 144 of the coupling handle 120 when a predetermined amount of radially inward force is not exerted (e.g., when an unlocked state is generated). With the visual indicator 136 located at or near the distal end 138 of the coupling body bottom 110, a user can easily determine if a locked state is generated or an unlocked state is generated. For example, when a locked state is generated, the distal end 138 of the coupling body bottom 110 extends beyond the distal end 144 of the coupling handle 120 so that a user can see the visual indicator 136. When an unlocked state is generated, the distal end 138 of the coupling body bottom 110 does not extend beyond the distal end 144 of the coupling handle 120 so that a user cannot see the visual indicator 136.

Figure 5:
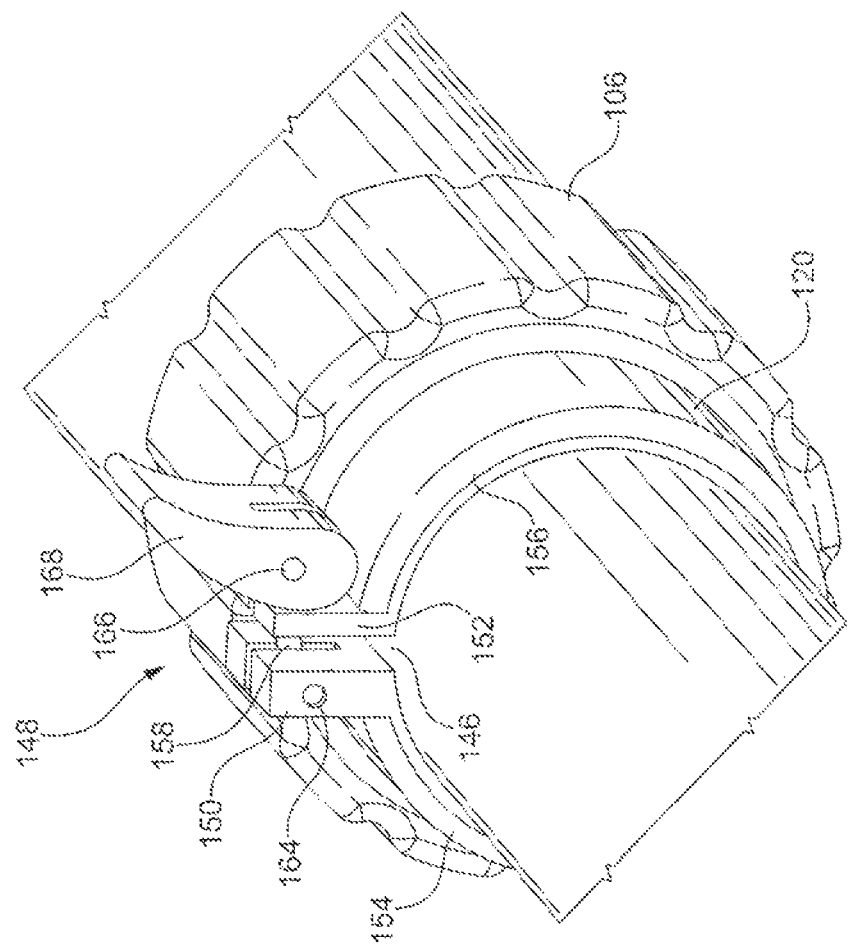
FIG. 5 is an embodiment of the coupling mechanism coupling two sections of pipe, showing the coupling mechanism in an unlocked state.
Figure 6:
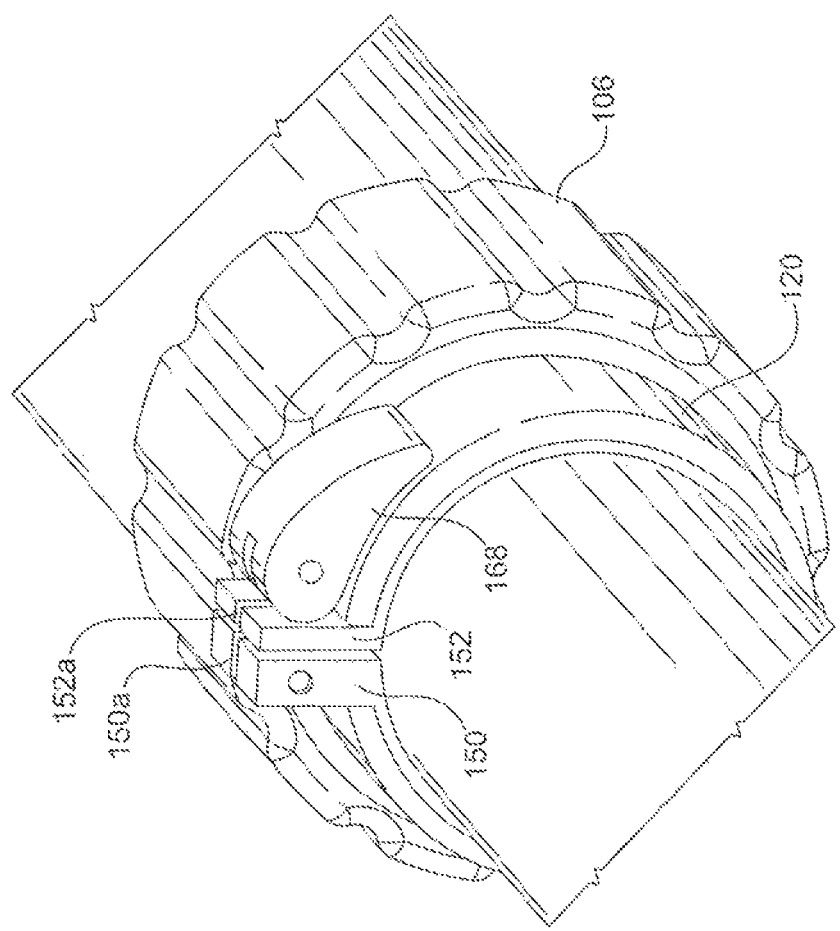
FIG. 6 is an embodiment of the coupling mechanism coupling two sections of pipe, showing the coupling mechanism in a locked state.

Referring to FIGS. 5-6, in some embodiments, the coupling handle 120 can be configured as a ring with a break 146 formed in the coupling handle 120. The coupling handle 120 can be fabricated from a rigid but resilient material that allows the coupling handle 120 to deflect without plastic deformation. The break 146 can be bridged by a cam-clamp 148. The cam-clamp 148 can include a first fork member 150 extending from the coupling handle outer surface 126 at a break first side 154 and a second fork member 152 extending from the coupling handle outer surface 126 at a break second side 156. A pivot rod 158 can be pivotally connected to the first fork member 150 via a first pivot 164. A cam 168 can be pivotally connected to the pivot rod 158 via a second pivot 166. The pivot rod 158 can be configured to insert between each slot 150a, 152a of each fork member 150, 152. The cam 168 can be rotated about the pivots 164, 166. The geometry of the cam 168 can cause the break first side 154 to move relative to the break second side 156, depending on the rotational position and direction of the cam 168. The cam 168 can be rotated to cause the break first side 154 to move towards the break second side 156, thereby causing the coupling handle 120 to move radially inward towards the coupling handle longitudinal axis 132. The cam 168 can be rotated to cause the break first side 154 to move away from the break second side 156, thereby causing or allowing the coupling handle 120 to move radially outward from the coupling handle longitudinal axis 132. Thus, when coupling handle 120 is positioned to be over at least a portion of the coupling body bottom 110 and the coupling handle 120 is caused to move radially inward towards the coupling handle longitudinal axis 132 (via rotation of the cam 168), the coupling body bottom 110 can be caused to move radially inward towards the coupling body longitudinal axis 118. Rotation of the cam 168 in an opposite direction can cause or allow the coupling handle 120 to move radially outward away from the coupling handle longitudinal axis 132, relieving the radially inward pressure on the coupling body bottom 110. It should be noted that the coupling handle 120 in this embodiment can be an extension of the coupling body 106, or the coupling body 106 can be an extension of the coupling handle 120. In other words, the coupling mechanism 100 in this embodiment can be a single-piece construction. Alternatively, the coupling mechanism 100 in this embodiment can include only the coupling handle 120 and the cam-clamp 148. All of the clamping forces generated by the cam-clamp 148 can be applied directly to the second pipe 104.

The geometry of the cam 168 can allow the cam 168 to temporarily lock in place when the coupling handle 120 is caused to move radially inward towards the coupling handle longitudinal axis 132. For example, the cam 168 can be shaped to conform to at least a portion of the coupling handle outer surface 126 when rotated against the coupling handle outer surface 126. The cam 168 can be further shaped to inhibit motion of the cam 168 from being against the coupling handle outer surface 126 unless actively rotated away from the coupling handle outer surface 126.

With the cam-style coupling handle 120 configuration, the visual indicator 136 can be the relative position of the cam 168. For example, the cam 168 being rotated against the coupling handle outer surface 126 (e.g., so that the cam 168 abuts the coupling handle outer surface 126) can be an indicator that a locked state is generated. The cam 168 being rotated away from the coupling handle outer surface 126 (e.g., so that the cam 168 does not abut the coupling handle outer surface 126) can be an indicator that an unlocked state is generated.

Figure 7:
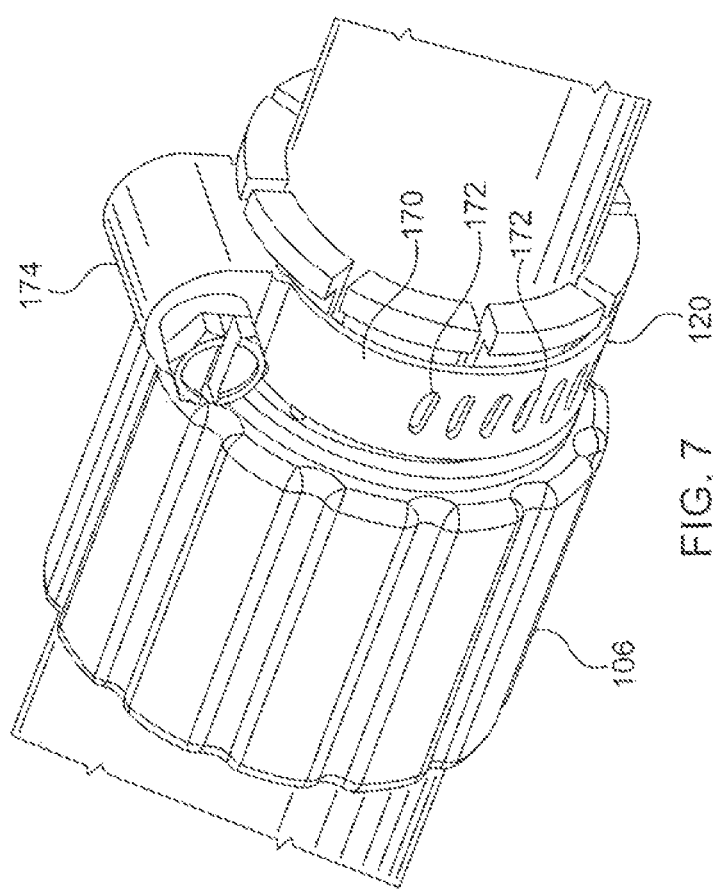
FIG. 7 is an embodiment of the coupling mechanism coupling with a wormgear closure system.

Referring to FIG. 7, in some embodiments, the coupling handle 120 can be configured as a band 170 having a plurality of grooves, teeth, or apertures formed in a surface thereof. For example, the band 170 can include a flexible material having a plurality of apertures 172 formed in the band 170, each aperture 172 extending from a first band surface (e.g., the coupling handle outer surface 126) to a second band surface (e.g., the coupling handle inner surface 128). The band 170 can be wrapped around at least a portion of the coupling body bottom 110 and be mechanically connected to a wormgear 174. The wormgear 174, engaging the apertures 172, can be rotated in a first direction to cause the band 170 to move radially inward towards the coupling handle longitudinal axis 132. The wormgear 174 can be rotated in a second direction to cause the band 170 to move radially outward from the coupling handle longitudinal axis 132. When coupling handle 120 is over at least a portion of the coupling body bottom 110 and the coupling handle 120 is caused to move radially inward towards the coupling handle longitudinal axis 132, the coupling body bottom 110 can be caused to move radially inward towards the coupling body longitudinal axis 118, exerting radially inward pressure on the coupling body bottom 110 (radially inward towards the coupling body longitudinal axis 118). As the coupling handle 120 is caused to move in a direction that is away from the coupling body 106, the radially inward pressure on the coupling body bottom 110 is relieved.

Referring back to FIG. 3, in some embodiments, the coupling body inner surface 114 at or near the coupling body top 108 can include a sealing mechanism 178. The sealing mechanism 178 can be configured to provide a fluid (e.g., gas and/or liquid) seal between the coupling body inner surface 114 and the outer surface of the second pipe 104. The sealing mechanism 178 can be an elastomeric body 180 (e.g., rubber, plastic, silicon, etc.) that is secured to a portion of the coupling body inner surface 114. In some embodiments, the sealing mechanism 178 can include a track 182 formed in the coupling body inner surface 114 configured to receive and retain the elastomeric body 180. For example, the track 182 can be formed in the coupling body inner surface 114 so as to circumscribe an entire circumference perpendicular to the coupling body longitudinal axis 118 of the coupling body inner surface 114. The track 182 can have a width 184 and a depth 186 to receive the elastomeric body 180 and retain the elastomeric body 180 by an interference fit. The elastomeric body 180 can be a rubber or silicon O-ring, quad ring, lip seal, etc. The elastomeric body 180 can be made to deform when the second pipe 104 is inserted into the coupling body bottom 110 due to the physical contact with the outer surface of the second pipe 104. The deformation can generate a fluid seal between the elastomeric body 180 and the outer surface of the second pipe 104.

The securement of the first pipe 102 to the coupling body 106 can generate a fluid seal between the first pipe 102 and the coupling body 106. When the coupling body 106 and the coupling handle 120 are engaged, a fluid tight seal is made between the coupling mechanism 100 and the two sections of pipe 102, 104 at all times. For example, the securement between the first pipe 102 and the coupling body 106 and the configuration and placement of the sealing mechanism 178 of the coupling body 106 with the second pipe 104 generates a fluid seal between the coupling mechanism 100 and the pipes 102, 104, regardless of: 1) whether the coupling mechanism 100 is in a locked state; 2) whether the coupling mechanism 100 is in an unlocked state; 3) whether the second pipe 104 is stationary; 4) whether the second pipe 104 is moving relative to the first pipe 102 and/or the coupling mechanism 100; and 5) regardless of the type of coupling handle 120 that is used.

Thus, the coupling mechanism 100 separates the sealing and coupling functions. This can provide a more robust operation and reduce the necessity for adjustment to maintain fluid tight sealing between cooperating pipe sections 102, 104. Causes for adjustment with prior art systems can include aging of material, erosion, or fatigue. With adjustment, prior art systems require a user to break the seal in order to make an adjustment. Embodiments of the inventive coupling mechanism 100, however, utilize the specifically configured sealing mechanism 178 and exploit the geometry of the coupling mechanism 100 to provide constant fluid tight sealing regardless of the coupling mechanism 100 being in the locked state or unlocked state. Thus, the coupling mechanism 100 may be disengaged, the pipes' 102, 104 relative positions adjusted, and the coupling mechanism 100 re-engaged without losing the fluid tight seal.

Figure 9:
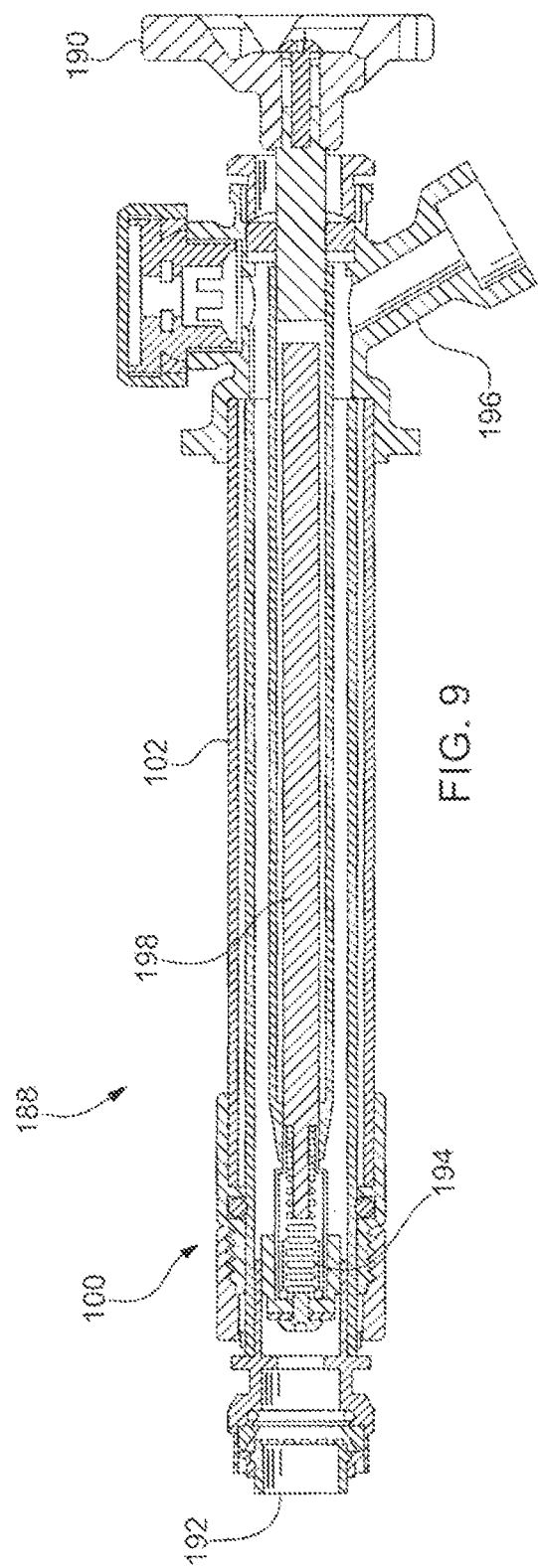
FIG. 9 shows a cross sectional view of an embodiment of the coupling mechanism used with an embodiment of an adjustable faucet assembly.

Referring to FIGS. 8-9, the coupling mechanism 100 can be used with a faucet assembly 188 and/or be used as part of a faucet assembly 188. The faucet assembly 188 can include an exterior handle 190, an end connection 192, a shut off mechanism 194, and/or a hose bibb 196. Some embodiments can include an adjustable faucet assembly 188. The adjustable faucet assembly 188 can include the first pipe 102 and the second pipe 104 configured to telescopically engage each other.

For example, the adjustable faucet assembly 188 can include the first pipe 102, the first pipe 102 having a first pipe first end 102a and a first pipe second end 102b. (See FIG. 1). The adjustable faucet assembly 188 can include the second pipe 104, the second pipe 104 having a second pipe first end 104a and a second pipe second end 104b. The first pipe 102 can have an inner diameter that is greater than an outer diameter of the second pipe 104, thereby allowing the second pipe 104 to axially traverse the first pipe 102 in a telescoping manner. The first pipe first end 102a can be configured to extend from a building or a structure so as to be located at an exterior of the building. The first pipe second end 102b can be configured to extend from a building or a structure so as to be located at an interior the building. The first pipe second end 102b can be secured to the coupling body inner surface 114 at or near the coupling body top 108. The second pipe first end 104a can be configured to axially insert into the first pipe second end 102b and the coupling body inner surface 114 at or near the coupling body bottom 110. Both the second pipe first end 104a and the second pipe second end 104b can be located in the interior of the building.

The second pipe second end 104b can be configured to connect to the end connection 192. The end connection 192 can be an adapter to facilitate fluid flow from a fluid source to the second pipe first end 104a. The hose bibb 196 can extend from the first pipe 102 near the first pipe first end 102a. The hose bibb 196 can be configured to allow the fluid flow from the fluid source to exit the faucet assembly 188. The first pipe first end 102a can be configured to be connected to an exterior handle 190. The exterior handle 190 can be mechanically connected to a telescoping rotating shaft 198 that operates the shut off mechanism 194. The telescoping rotating shaft 198 runs from the exterior handle 190, through the interiors of the first pipe 102 and the second pipe 104, and to the shut off mechanism 194. The shut off mechanism 194 can be located within the second pipe 104 at a position that is between the second pipe first end 104a and the second pipe second end 104b. The shut off mechanism 194 can be a valve that selectively permits and prevents fluid flow from the fluid source to the second pipe first end 104a. The shut off mechanism 194 is located within the interior of the building, while the exterior handle 190 is located outside the building, but the shut off mechanism 194 can be operated via the exterior handle 190. This configuration can prevent or inhibit water lying in the sections of pipe located outside the building (or close to the exterior of the building), which can freeze in cold temperatures and cause damage. The configuration achieves this because the shut off mechanism 194 is located well within the interior of the building and when it is caused to close off the pipe-way, the remaining water is bled from the section of pipes that lie between the shut off mechanism 194 and the hose bibb 196.

The telescoping rotating shaft 198 allows the second pipe 104 to be moved relative to the first pipe 102 by telescoping in length commensurate with the telescoped length of the first pipe 102 and the second pipe 104. The coupling mechanism 100 can be used to selectively transition the faucet assembly 188 to and from the locked state and the unlocked state. In the unlocked state, the second pipe 104 can be moved relative to the first pipe 102 and/or coupling mechanism 100. As the second pipe 104 is moved relative to the first pipe 102 and/or coupling mechanism 100, the telescoping rotating shaft 198 is adjusted in a commensurate length to accommodate the change in overall length of the adjustable faucet assembly 188. In the locked state, the second pipe 104 to be held stationary relative to the first pipe 102 and/or the coupling mechanism 100.

It should be noted, that embodiments of the coupling mechanism 100 can facilitate transitioning to and from the locked and unlocked states by a user using his or her hands (e.g. no tools are required to transition to and from the locked and unlocked states), or can reduce the force needed to transition to and from the locked and unlocked state so as to allow a user to easily operate the coupling mechanism 100 with common house-hold tools. A user can simply rotate the coupling handle 120 (or the cam 168) by hand in a desired direction.

It is contemplated for the faucet assembly 188 with the coupling mechanism 100 to be used to replace prior art systems having multiple freeze proof faucets that are limited by fixed length pipe. This can be beneficial for plumbing suppliers by reducing the number of skews on their shelves and inventory, giving them room to stock other items. Embodiments of the faucet assembly 188 can also allow installers or contractors to carry fewer components on their trucks and will enable them to complete more jobs with reduced trips back to supply houses.

Figure 10:
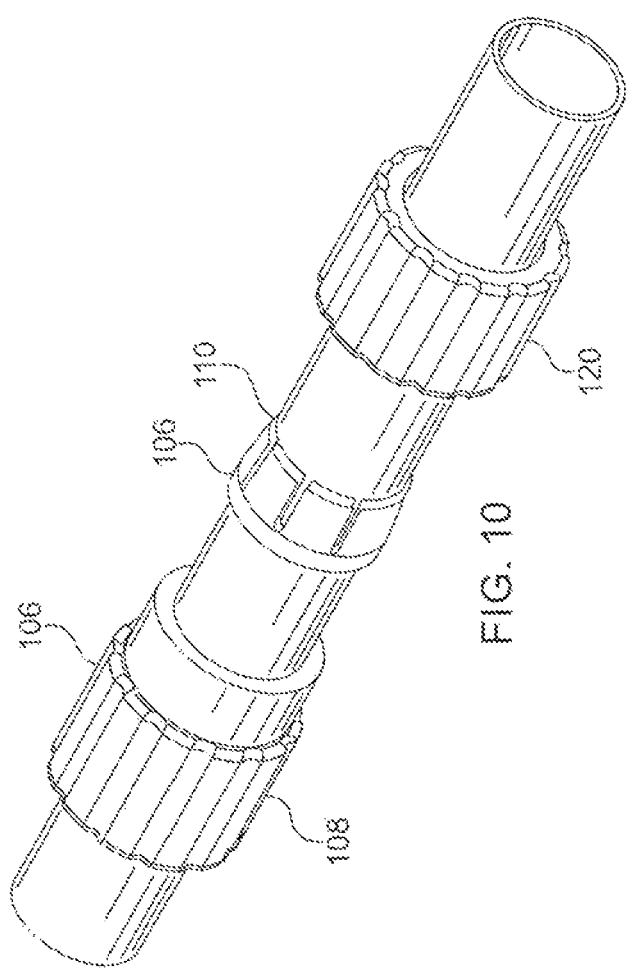
FIG. 10 shows an embodiment of the coupling mechanism having a coupling body structured as a plurality of components.
Figure 11B:
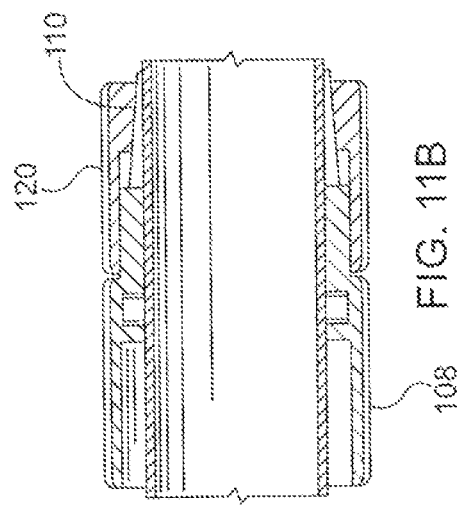
FIG. 11B is a cross-sectional view of an embodiment of the coupling mechanism having a coupling body structured as a plurality of components.
Figure 11A:
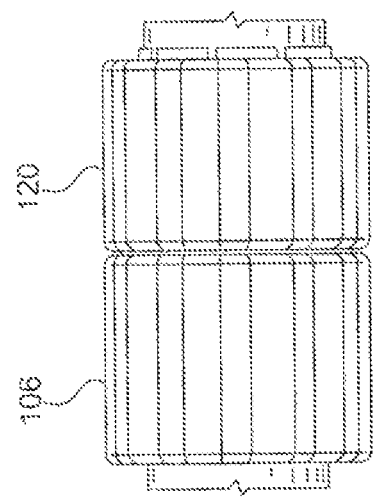
FIG. 11A is another view of an embodiment of the coupling mechanism having a coupling body structured as a plurality of components.

Referring to FIGS. 10-11, in some embodiments, the coupling body 108 can be constructed from a plurality of components. For example, the coupling body bottom 110 can be a separate component from that of the coupling body top 108, wherein the coupling body bottom 110 abuts or mates with the coupling body top 108. This may be done so that the coupling body 106 is structured as two different components, each component being made from a different material. For example, the coupling body top 108 can be fabricated from metal, such as brass for example. The coupling body bottom 110 can be fabricated from a polymer material. The brass coupling body top 108 may be desired for rigidity and structural integrity. The polymer coupling body bottom 110 may be desired for resiliency and compressibility. Thus, a coupling body 106 having a brass coupling body top 108 and a polymer coupling body bottom 110 can be used to provide both structural integrity and compressibility to the coupling mechanism 100.

With the coupling body 106 being structured as two separate components, the coupling body bottom 110 can be attached to the coupling body top 106 via an adhesive, for example, to generate a coupling body 106 configuration of a coupling body 106 being an annular object having a coupling body top 108, a coupling body bottom 110, a coupling body outer surface 112, a coupling body inner surface 114, and a coupling body opening 116 within a volume of space defined by the coupling body inner surface 114. The coupling body longitudinal axis 118 can run from the coupling body top 108 to the coupling body bottom 110. Alternatively, the coupling body bottom 110 can remain separated and positioned to abut against the coupling body top 108. When the coupling body bottom 110 is positioned to abut against the coupling body top 108, a coupling body 106 configuration is generated, the coupling body 106 configuration being a coupling body 106 being an annular object having a coupling body top 108, a coupling body bottom 110, a coupling body outer surface 112, a coupling body inner surface 114, and a coupling body opening 116 within a volume of space defined by the coupling body inner surface 114. The coupling body longitudinal axis 118 can run from the coupling body top 108 to the coupling body bottom 110.

It should be understood that modifications to the embodiments disclosed herein can be made to meet a particular set of design criteria. For instance, the number of or configuration of coupling mechanisms 100, coupling bodies 106, coupling handles 120, sealing mechanisms 178, and/or other components or parameters may be used to meet a particular objective.

It will be apparent to those skilled in the art that numerous modifications and variations of the described examples and embodiments are possible in light of the above teachings of the disclosure. The disclosed examples and embodiments are presented for purposes of illustration only. Other alternative embodiments may include some or all of the features of the various embodiments disclosed herein. Therefore, it is the intent to cover all such modifications and alternative embodiments as may come within the true scope of this invention, which is to be given the full breadth thereof. Additionally, the disclosure of a range of values is a disclosure of every numerical value within that range, including the end points.

Therefore, while certain exemplary embodiments of apparatuses and methods of making and using the same have been discussed and illustrated herein, it is to be distinctly understood that the invention is not limited thereto but may be otherwise variously embodied and practiced within the scope of the following claims.

We claim:

1. An adjustable anti-freeze adjustable faucet system, comprising:

an outer pipe having an inner diameter and an inner pipe having an outer diameter, the outer pipe inner diameter being greater than the inner pipe outer diameter, and the inner pipe extending into the outer pipe, wherein the outer pipe has opposite first and second ends, the inner pipe has opposite first and second ends, and the second end of the inner pipe is positioned outside of the outer pipe;

a coupling mechanism cooperatively associated with the outer and inner pipes to provide locked and unlocked states of the adjustable faucet system, wherein in the unlocked state the inner pipe is allowed to axially traverse the outer pipe in a telescoping manner, and in the locked state the inner pipe is restricted from axially traversing the outer pipe in a telescoping manner, and wherein the coupling mechanism comprises:

a coupling body having a coupling body first end, a coupling body second end, a coupling body outer surface, a coupling body inner surface, and a coupling body opening within a volume of space defined by the coupling body inner surface, wherein a coupling body longitudinal axis runs from the coupling body first end to the coupling body second end, wherein the coupling body second end bottom is deflectable radially inward towards and radially outward away from the coupling body longitudinal axis; and a coupling handle having a coupling handle first end, a coupling handle second end, a coupling handle outer surface, a coupling handle inner surface, and a coupling handle opening within a volume of space defined by the coupling handle inner surface, wherein a coupling handle longitudinal axis runs from the coupling handle first end to the coupling handle second end;

wherein the coupling handle opening at the coupling handle first end is in receipt of a portion of the coupling body, and the coupling body longitudinal axis extends along the coupling handle longitudinal axis;

wherein the coupling body opening at the coupling body first end is in receipt of the outer pipe, and the coupling body is connected to the outer pipe so that the outer pipe is retained in a fixed position relative to the coupling body;

wherein each of the coupling body opening at the coupling body second end and the coupling handle opening at the coupling handle second end is in receipt of a portion of the inner pipe, and in the unlocked state the coupling mechanism is configured to both allow axial motion of the inner pipe relative to the outer pipe and allow axial motion of the inner pipe relative to the coupling mechanism; and wherein the coupling handle is configured to selectively engage with the coupling body second end, wherein the engagement is capable of exerting a radially inward pressure on the coupling body second end for at least partially providing the locked state;

an exterior handle rotatably connected to the outer pipe first end;

a shut off mechanism located within the inner pipe; and a telescoping rotating shaft mechanically connected to the exterior handle so that the telescoping rotating shaft rotates within both of the outer and inner pipes in response to the exterior handle being rotated, the telescoping rotating shaft configured to operate the shut off mechanism in response to the exterior handle being rotated.

2. The adjustable faucet system recited in claim 1, wherein:

the engagement of the coupling handle with the coupling body generates the locked state when the coupling handle exerts the radially inward pressure on the coupling body second end;

the locked state prevents movement of the inner pipe relative to the outer pipe and/or the coupling mechanism by the coupling body second end exerting pressure against an outer surface of the inner pipe;

the engagement of the coupling handle with the coupling body generates the unlocked state when the coupling handle does not exert the radially inward pressure on the coupling body second end; and the unlocked state allows movement of the inner pipe relative to the outer pipe and/or the coupling mechanism by the coupling body second end not exerting pressure against the outer surface of the inner pipe.

3. The adjustable faucet system recited in claim 2, wherein the locked state is generated when the coupling handle is traversed along the coupling body longitudinal axis in a direction towards the coupling body so as to be positioned over at least the coupling body second end, wherein at least a portion of the coupling handle inner surface exerts the radially inward pressure on the coupling body second end.

4. The adjustable faucet system recited in claim 2, wherein the locked state is generated when the coupling handle is positioned over at least the coupling body second end and is caused to move radially inward towards the coupling body longitudinal axis so that at least a portion of the coupling handle inner surface exerts the radially inward pressure on the coupling body second end.

5. The adjustable faucet system recited in claim 2, wherein the coupling body is engaged by threads with the coupling handle.

6. The adjustable faucet system recited in claim 1, wherein the coupling handle further comprises a ring with a break that is bridged by a cam-clamp.

7. The adjustable faucet system recited in claim 1, wherein the coupling handle further comprises a band mechanically connected to a wormgear.

8. The adjustable faucet system recited in claim 1, comprising a sealing mechanism configured to provide a fluid seal between the coupling body inner surface and an outer surface of the inner pipe in the locked state.

9. The adjustable faucet system recited in claim 8, wherein the sealing mechanism comprises:

an elastomeric body; and a track formed in the coupling body inner surface, wherein the track is in receipt of and retains the elastomeric body.

10. The adjustable faucet system recited in claim 9, wherein the elastomeric body deforms when the inner pipe is inserted into the coupling body opening at the coupling body second end, and the coupling body is in the locked state, wherein the deformation forms the fluid seal.

11. The adjustable faucet system recited in claim 1, wherein the coupling body second end comprises a visual indicator.

12. The adjustable faucet system recited in claim 11, wherein the visual indicator is located on the coupling body outer surface at or near a distal end of the coupling body second end.

13. The adjustable faucet system recited in claim 12, wherein:

the distal end of the coupling body second end extends beyond a distal end of the coupling handle in the locked state of the coupling mechanism, thereby exposing the visual indicator; and the distal end of the coupling body second end does not extend beyond a distal end of the coupling handle second end in the unlocked state of the coupling mechanism, thereby concealing the visual indicator.

14. The adjustable faucet system recited in claim 1, wherein the coupling body second end is configured as a flanged structure having at least one finger.

15. The adjustable faucet system recited in claim 1, wherein the at least one finger comprises a deflectable member extending from the coupling body second end along a direction that is parallel with the coupling body longitudinal axis.

16. The adjustable faucet system recited in claim 1, wherein the shut off mechanism is a valve, and the valve is located within the inner pipe.

17. The adjustable faucet system recited in claim 1, wherein:

the telescoping rotating shaft is mechanically connected to the shut off mechanism;

the telescoping rotating shaft extends in an interior space of the inner pipe; and the telescoping rotating shaft extends in an interior space of the outer pipe.

18. The adjustable faucet system recited in claim 1, wherein:

the coupling body longitudinal axis is coaxial with the coupling handle longitudinal axis, and the coupling body opening at the coupling body first end is in receipt of the outer pipe second end.

19. An anti-freeze adjustable faucet system, comprising:

an outer pipe having an inner diameter and an inner pipe having an outer diameter, the outer pipe inner diameter being greater than the inner pipe outer diameter, and the inner pipe extending into the outer pipe, wherein the outer pipe has opposite first and second ends, the inner pipe has opposite first and second ends, and the second end of the inner pipe is positioned outside of the outer pipe;

a coupling mechanism cooperatively associated with the outer and inner pipes to provide locked and unlocked states of the adjustable faucet system, wherein in the unlocked state the inner pipe is allowed to axially traverse the outer pipe in a telescoping manner, and in the locked state the inner pipe is restricted from axially traversing the outer pipe in a telescoping manner, and wherein the coupling mechanism comprises:

a coupling body having a coupling body first end, a coupling body second end, a coupling body outer surface, a coupling body inner surface, and a coupling body opening within a volume of space defined by the coupling body inner surface, wherein a coupling body longitudinal axis runs from the coupling body first end to the coupling body second end, wherein the coupling body second end is deflectable radially inward towards and radially outward away from the coupling body longitudinal axis; and a coupling handle having a coupling handle first end, a coupling handle second end, a coupling handle outer surface, a coupling handle inner surface, and a coupling handle opening within a volume of space defined by the coupling handle inner surface, wherein a coupling handle longitudinal axis runs from the coupling handle first end to the coupling handle second end;

wherein the coupling handle opening at the coupling handle first end is in receipt of a portion of the coupling body, and when the coupling body longitudinal axis is coaxial with the coupling handle longitudinal axis;

wherein the coupling body opening at the coupling body first end is in receipt of the outer pipe, and the coupling body is connected to the outer pipe so that the outer pipe is retained in a fixed position relative to the coupling body;

wherein each of the coupling body opening at the coupling body second end and the coupling handle opening at the coupling handle second end is in receipt of a portion of the inner pipe, and in the unlocked state the coupling mechanism is configured to both allow axial motion of the inner pipe relative to the outer pipe and allow axial motion of the inner pipe relative to the coupling mechanism; and wherein the coupling handle is configured to selectively engage with the coupling body second end, wherein the engagement is capable of exerting a radially inward pressure on the coupling body second end for at least partially providing the locked state;

an exterior handle rotatably connected to the outer pipe first end;

a shut off mechanism located within the inner pipe; and a telescoping rotating shaft mechanically connected to the exterior handle so that the telescoping rotating shaft rotates within both of the outer and inner pipes in response to the exterior handle being rotated, the telescoping rotating shaft configured to operate the shut off mechanism in response to the exterior handle being rotated;

wherein:

the engagement of the coupling handle with the coupling body generates the locked state when the coupling handle exerts the radially inward pressure on the coupling body second end;

the locked state prevents movement of the inner pipe relative to the outer pipe and/or the coupling mechanism by the coupling body second end exerting pressure against an outer surface of the inner pipe;

the engagement of the coupling handle with the coupling body generates the unlocked state when the coupling handle does not exert the radially inward pressure on the coupling body second end; and the unlocked state allows movement of the inner pipe relative to the outer pipe and/or the coupling mechanism by the coupling body second end not exerting pressure against the outer surface of the inner pipe;

wherein the coupling body second end further comprises a visual indicator located on the coupling body outer surface at or near a distal end of the coupling body second end, and wherein the shut off mechanism is a valve, and the valve is located within the inner pipe.

20. The adjustable faucet system recited in claim 19, wherein the distal end of the coupling body second end extends beyond a distal end of the coupling handle second end when the locked state is generated, thereby exposing the visual indicator; and the distal end of the coupling body second end does not extend beyond a distal end of the coupling handle second end when the unlocked state is generated, thereby concealing the visual indicator.

21. The adjustable faucet system recited in claim 19, wherein the visual indicator comprises a marking and/or a shape.

* * * * *

UNITED STATES PATENT AND TRADEMARK OFFICE
CERTIFICATE OF CORRECTION

| | | |
|---|---|---|
| PATENT NO. | : 12,110,666 B2 | |
| APPLICATION NO. | : 16/968969 | |
| DATED | : October 8, 2024 | |
| INVENTOR(S) | : Daniel Foster and Matthew Williams | |

It is certified that error appears in the above-identified patent and that said Letters Patent is hereby corrected as shown below:

In the Claims

Claim 1, Column 14, delete Line 13 and insert: --An anti-freeze adjustable faucet system,--

Claim 1, Column 14, delete Line 38 and insert: --wherein the coupling body second end is--

Claim 19, Column 17, delete Line 18 and insert: --coupling body, and the coupling body longi- --

Signed and Sealed this
Third Day of December, 2024

Katherine Kelly Vidal
*Director of the United States Patent and Trademark Office*